United States Patent [19]

Dietrich et al.

[11] Patent Number: 4,831,302

[45] Date of Patent: May 16, 1989

[54] APPARATUS FOR MONITORING THE WEAR UPON CARBON BRUSHES IN ELECTRICAL MACHINES

[75] Inventors: Michael Dietrich, Rafz; Wolfgang Dietrich, Schaffhausen, both of Switzerland

[73] Assignee: G. Dietrich GmbH Spezialfabrik für Bürstenhalter u. Kunststoffteile, Jestetten, Fed. Rep. of Germany

[21] Appl. No.: 109,458

[22] Filed: Oct. 16, 1987

[30] Foreign Application Priority Data

Oct. 23, 1986 [DE] Fed. Rep. of Germany ... 8628227[U]

[51] Int. Cl.[4] ............................ H02K 13/00

[52] U.S. Cl. ............................ 310/242; 310/68 B; 310/245; 200/61.58 R; 388/836

[58] Field of Search ............... 310/238, 239, 240, 241, 310/242, 244, 245, 246, 247, 248, 68 B, 68 E, 72, 73; 318/361, 541, 532; 200/24–26, 61.58, 153 L, 153 T, 237

[56] References Cited

U.S. PATENT DOCUMENTS

| | | | |
|---|---|---|---|
| 3,398,248 | 8/1968 | Klauss | 200/153 L |
| 3,575,563 | 4/1971 | Russell | 200/153 L |
| 3,617,661 | 11/1971 | Nome | 200/153 T |
| 4,272,695 | 6/1981 | Buchwald | 310/242 |
| 4,344,009 | 8/1982 | Reynolds | 310/242 |
| 4,348,608 | 9/1982 | Michael | 310/292 |
| 4,420,705 | 12/1983 | Kimberlin | 310/242 |
| 4,471,254 | 9/1984 | Yamada | 310/242 |
| 4,488,078 | 12/1984 | Orton | 310/242 |

FOREIGN PATENT DOCUMENTS

| | | | |
|---|---|---|---|
| 8234555.4 | 5/1983 | Fed. Rep. of Germany | 310/239 UX |
| 3444482 | 6/1986 | Fed. Rep. of Germany | 310/239 UX |

*Primary Examiner*—R. Skudy
*Attorney, Agent, or Firm*—Peter K. Kontler

[57] ABSTRACT

The wear upon at least one of several carbon brushes in a brush holder is monitored by a lever one arm of which is biased against the rear end face of a selected brush by a spring and another arm of which actuates a microswitch in response to a predetermined amount of wear upon the brush as a result of engagement with a commutator or a slip ring, namely in response to a predetermined angular displacement of the lever from a starting position which is assumed by the lever when its first arm engages a freshly inserted brush.

8 Claims, 1 Drawing Sheet

APPARATUS FOR MONITORING THE WEAR UPON CARBON BRUSHES IN ELECTRICAL MACHINES

BACKGROUND OF THE INVENTION

The invention relates to improvements in electrical machines which employ carbon brushes, and more particularly to improvements in apparatus for monitoring the condition of brushes in such machines.

It is known to install two or more carbon brushes on a common brush holder which is mounted in an electrical machine in such position that the brushes can engage with the commutator or slip ring of the machine. The brushes undergo wear and must be replaced at certain intervals when the amount of wear reaches a maximum permissible value. As a rule, the brushes are biased against the commutator or slip ring by a spring-biased follower means so as to ensure that each brush will remain in contact with the adjacent part of the machine regardless of the amount of wear upon the brush.

Timely replacement of spent brushes is desirable and advantageous because this reduces the likelihood of an abrupt interruption of operation at an inopportune time, e.g., when the machine is in actual use, and/or damage to the machine. Spent brushes could damage the collector of an electrical machine.

In accordance with a presently known proposal, the machine is equipped with a stop which prevents further forward movement of a brush when the wear upon such brush reaches the maximum permissible value, i.e., when the length of the brush is reduced to a minimum permissible value.

In accordance with a different prior proposal, the follower which biases the brush against a commutator or against a slip ring carries an insulated spring which engages a complementary contact on a rail of the brush holder to thereby initiate the generation of a signal denoting that the wear upon the brush has reached the maximum permissible value. A drawback of such monitoring devices is that their contacts are exposed to dust, which develops as a result of wear upon the brushes, and to other foreign matter in the surrounding atmosphere. This can result in premature or delayed generation of signals with attendant potential damage to the commutator or to another part of the machine and/or in abrupt interruption of operation of the machine. Another drawback of such monitoring devices is that the contacts are not readily accessible and can be manipulated only by specially designed tools. Still further, the exact positioning of contacts is different for each type of brush holders. Moreover, the rails and the contacts take up a substantial amount of space which is not available on relatively small brush holders so that the utilization of such monitoring devices is limited to certain large types of brush holders and electrical machines. Reference may be had to German Utility Model No. 82 34 555.4.

German Offenlegungsschrift No. 34 44 482 discloses a modified monitoring device which employs a microswitch. This contributes to greater reliability of the signal generation. However, the monitoring device which is disclosed in this printed publication cannot be used with all types of brush holders because it takes up too much space so that it cannot monitor the extent of wear of brushes in a relatively small brush holder, especially if the brush holder is designed to carry several closely adjacent brushes.

OBJECTS AND SUMMARY OF THE INVENTION

An object of the invention is to provide a versatile apparatus for monitoring the condition of brushes in electrical machines and to design the apparatus in such a way that it can be used in conjunction with large or small brush holders and regardless of the number of brushes on the brush holder.

Another object of the invention is to provide a novel and improved arrangement for actuating a signal generating device in response to a predetermined amount of wear upon a brush.

A further object of the invention is to provide a signal generating device whose operation is not affected by particles of brushes and/or other contaminants in the surrounding area.

An additional object of the invention is to provide an apparatus which can employ or be used in conjunction with existing or available brush holders.

Still another object of the invention is to provide an apparatus which can be installed, dismantled or adjusted with readily available tools.

An additional object of the invention is to provide an apparatus whose simplicity, versatility and reliability greatly exceed such characteristics of heretofore known apparatus.

The invention is embodied in a combination of elements which can be used in an electrical machine, such as an electric generator. The combination comprises a brush holder, a brush which is movably mounted in the holder and undergoes progressive wear while in use in an electrical machine to thereby move relative to the holder through distances corresponding to the extent of wear, and novel and improved means for monitoring the extent of wear upon the brush. The monitoring means includes a mobile follower which can be biased by one or more springs (or can be made of an elastomeric material and is then installed in prestressed condition). The follower has a first portion which bears upon and shares the movements of the brush relative to the holder so that the position of the first portion is indicative of the extent of wear upon the brush as long as the first portion is free to follow the movements of the brush relative to the holder, and a second portion which is movable along a predetermined path in response to wear upon the brush, i.e., in response to movement of the first portion relative to the holder. The monitoring means further comprises signal generating means (preferably a microswitch) which is adjacent a predetermined portion of the path and is operable by the second portion of the follower to generate a signal (e.g., an audible and/or visible signal) when the brush undergoes a predetermined amount of wear, i.e., when the first portion of the follower assumes a predetermined position relative to the brush holder.

The follower can include a one-piece lever or a composite lever which is pivotable with reference to the brush holder about a predetermined axis (the lever can be pivotably mounted on the brush holder). The lever has a first arm which includes the first portion and a second arm which includes the second portion of the follower so that the second portion moves along an arcuate path forming part of a circle when the lever pivots as a result of wear upon the brush. The lever can include a main portion (the first portion of the follower can constitute a component part of the main portion) and the second portion of the follower can be connected to such main portion by one or more screws, rivets or other suitable securing means.

The improved monitoring means can further comprise a bracket or other suitable means for separably or more or less permanently connecting the signal generating means to the brush holder.

The holder can include a section which is located in the path of movement of the first portion of the follower to arrest the first portion in response to predetermined additional wear upon the brush beyond the predetermined amount of wear. The second portion of such follower then cooperates with the signal generating means to effect the generation of a signal during the interval which elapses while the brush undergoes the additional wear. The brush holder can include a substantially tubular socket wherein the brush is movable to remain in contact with a commutator or with a slip ring, and the aforementioned section of the brush holder can form part of such socket.

The holder can be provided with two or more sockets each of which can movably guide a discrete carbon brush, and the improved combination can but need not always comprise a discrete follower for each brush and a discrete microswitch or other suitable signal generating means for each follower. Thus, if the wear upon two or more brushes which are movably installed in a common holder is more or less uniform, it suffices to provide a single signal generating means.

The novel features which are considered as characteristic of the invention are set forth in particular in the appended claims. The improved monitoring means itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
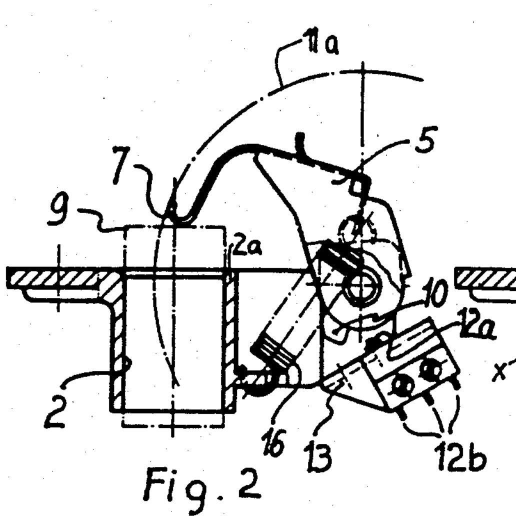
FIG. 2 is a sectional view as seen in the direction of arrows from the line II—II of FIG. 1, showing the follower of the monitoring means in a starting position which it assumes in response to insertion of a fresh carbon brush into the corresponding socket of the holder.
Figure 3:
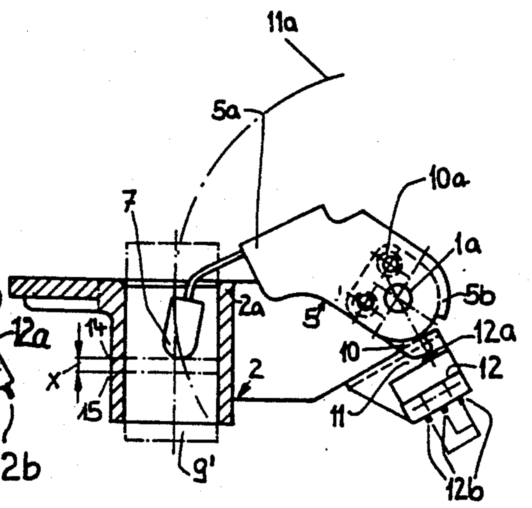
FIG. 3 shows the structure of FIG. 2 but with a slightly modified follower in a position in which it actuates the microswitch of the signal generating means.
Figure 1:
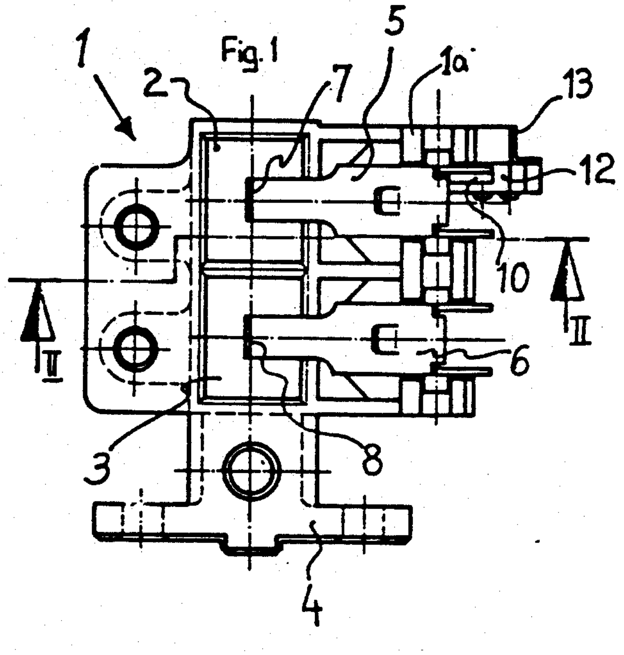
FIG. 1 is a plan view of a holder for two carbon brushes and of monitoring means for one of the brushes.

Referring first to FIGS. 1 to 3, there is shown a brush holder 1 having two tubular sockets 2 and 3 which are adjacent one another and each of which can receive a movable graphitized carbon brush. A freshly inserted full-sized carbon brush is shown in FIG. 2, as at 9, and the remnant of such brush, after a predetermined amount of wear as a result of contact with a commutator or with a slip ring, not shown, is indicated in FIG. 3 by phantom lines, as at 9'. The brush holder 1 further includes a flange-like section 4 which can be separably affixed to a brush yoke or another carrier, not shown, to properly position the holder 1 in an electrical machine, i.e., so that the brushes in the sockets 2 and 3 are adjacent to a commutator or a slip ring.

The holder 1 supports discrete coaxial pivot members or a single pivot member 1*a* for two pivotable followers 5, 6 respectively serving to bias the brushes in the respective sockets 2 and 3 downwardly, as seen in FIG. 2, namely away from the observer of FIG. 1. Each of the followers 5, 6 is a two-armed lever pivotable about the axis which is defined by the pivot member 1*a*. The follower 5 has a first arm 5*a* including a first follower portion 7 which bears against the rear end face of the brush 9 in the socket 2 to urge the front end face of the brush against a commutator or against a slip ring. A second arm 5*b* of the follower 5 includes a second follower portion 10 which resembles the lobe of a disc cam and is movable along an arcuate path 11 in response to pivoting of the follower 5 under the bias of a coil spring 16 and to an extent which is a function of the extent of wear upon the respective brush 9. The path of movement of the first portion 7 of the follower 5 is indicted by a phantom line 11*a*; each of the paths 11, 11*a* has its center of curvature on the axis of the pivot member 1*a*. One end convolution of the coil spring 16 for the follower 5 is connected to a retainer on the longer first arm 5*a* of this follower, and the other end convolution of the spring 16 is attached to a retainer on the brush holder 1 so that the follower 5 is permanently biased in a counterclockwise direction, as seen in FIGS. 2 and 3. The arms 5*a*, 5*b* and the portion 7 can be said to jointly constitute a main portion of the follower 5 which later further includes the aforementioned second portion 10.

The second follower 6 is preferably a lever similar to the member 5 and has a first arm with a first follower portion 8 bearing upon the rear end face of the brush 9 in the socket 3 under the action of a second coil spring, not shown. The second arm of the follower 6 may but need not be provided with a cam-like portion 10, depending upon whether or not the means which is used to monitor the extent of wear upon the brushes 9 in the holder 1 comprises a discrete signal generating device for each of the followers. The drawing merely shows a single signal generating device 12 in the form of an encapsulated microswitch having a movable portion or trip 12*a* adjacent a predetermined portion of the path 11 of movement of the cam 10 on the second arm 5*b* of the follower 5. A bracket 13 is provided to constitute a means for preferably separably and/or adjustably connecting the microswitch 12 to the brush holder 1 by means of one or more screws or other suitable fasteners.

The position of the trip 12*a* of the microswitch 12 with reference to the path 11 of movement of the cam second follower portion 10 (hereinafter called cam) is selected in such a way that the brush 9 in the socket 2 of the holder 1 undergoes a predetermined amount of wear when the trip 12*a* is engaged by the cam 10 and causes the microswitch 12 to initiate the generation of a signal, e.g., a visible and/or an audible signal. The terminals 12*b* of the microswitch 12 are connected to a device, e.g., a lamp, a horn or a display screen, which actually generates a signal in response to engagement of the trip 12*a* by the cam 10. At such time, the foremost part of portion 7 of the follower 5 assumes the solid-line position of FIG. 3 at a level 14. The first arm 5*a* of the follower 5 is then still spaced apart from a section 2*a* of the socket 2 for the respective brush 9. This means that the cam 10 can move relative to but remains in contact with the trip 12*a* (so that the microswitch 12 continues to initiate the generation of a signal) in response to certain additional wear upon the brush 9 in the socket 2, namely until the rear end face of the remnant (9′) of the brush descends to the level 15. The angular position of the follower 5 thereupon remains unchanged even if the remnant 9′ of the brush 9 in the socket 2 undergoes additional wear. The distance x between the levels 14 and 15 can be selected by the manufacturer of the illustrated apparatus or by the person installing the holder 1 in an electrical machine, e.g., by properly selecting the position of the trip **12*a* of the microswitch 12 with reference to the path 11 of movement of the cam 10 relative to the microswitch and its bracket 13. The microswitch 12 can be adjusted relative to the bracket 13 and/or the bracket 13 can be adjusted relative to the holder 1**.

An important advantage of the improved arrangement is that the microswitch 12 can be fully encapsulated so that it cannot be affected by fragments of the brushes 9 and/or other foreign matter in the surrounding atmosphere. This greatly reduces the likelihood f premature or delayed generation of signals which are to be detected by attendants who are to be informed that the brushes in the holder 1 require replacement. The cam 10 can be used to open or close the microswitch 12, and the signals (or the absence of signals) which are generated by the microswitch can be used for additional purposes, e.g., to arrest the electrical machine which employs the brush holder 1 and its brushes.

Another important advantage of the improved apparatus is that the first portion 7 can be disposed at a desired distance from the cam 10 and microswitch 12 so that the bracket 13 for the microswitch can be reached at any time without interfering with the action of the follower 5 upon the respective brush 9. This holds true regardless of the size of the holder 1 and regardless of the number of brushes which are mounted therein. Simple and readily available tools can be used to mount the brush holder 1 in the electrical machine and/or to mount the bracket 13 on the holder 1.

Figure 4:
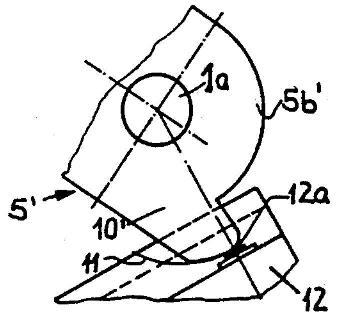
FIG. 4 is an enlarged view of a detail in the structure of FIG. 3, showing a one-piece follower.

FIG. 4 shows on a larger scale one presently preferred configuration of the cam 10′ on the second arm **5*b*′ of the follower 5′. This cam forms an integral part of the respective arm 5*b*′ (in fact, the entire follower 5′ can constitute a one-piece lever of metallic or other suitable material). Alternatively, the cam 10 can be riveted, bolted, screwed or otherwise secured to the respective arm of the follower 5, i.e., the cam 10, can be produced as a separate part and is thereupon affixed to the respective arm of the follower 5. This is shown in FIG. 3 wherein the cam 10 is secured to the arm 5*b* of the follower 5 by rivets, screws or other suitable fasteners 10*a***.

It goes without saying that the illustrated apparatus can be provided with a second microswitch which cooperates with the second portion of the follower 6 to generate a signal when the brush 9 in the socket 3 of the holder 1 undergoes a preselected maximum permissible amount of wear. Discrete microswitches 12 (or analogous signal generating means) for each brush 9 will be provided if the wear upon all brushes in the holder 1 is not uniform or is not expected to be uniform.

Still another important advantage of the improved apparatus is that the microswitch 12 can be caused to generate, or to initiate the generation of, a signal in good time before the wear upon the corresponding brush 9 is so extensive that further action of the respective follower 5 or 5′ upon the brush (to urge the latter against a slip ring or against a commutator) must be prevented by the section **2*a* of the socket 2. This ensures that the signal is being generated for a selected interval of time and the microswitch 12 can remain activated even after the arm 5*a* of the follower 5 or the corresponding are of the follower 5′ strikes against the section 2*a* of the socket 2. It is clear that the arm 5*a* can also be caused to engage another abutment, e.g., a separate part which is attached to the holder 1 in the path of movement of the arm 5*a* or another part of the follower 5 or 5′**.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. The combination of a brush holder; a brush which undergoes progressive wear while in use in an electrical machine and is movable relative to said holder through a distance corresponding to the extent of wear; and means for monitoring the extent of wear upon the brush, including a mobile follower having a first portion bearing upon the brush so as to perform a movement which is proportional to the extent of wear upon the brush and a second portion movable along a predetermined path in response to wear upon the brush, and signal generating means adjacent a predetermined portion of said path and operable by the second portion of said follower to generate a signal when said brush undergoes a predetermined amount of wear, said signal generating means including a microswitch having a portion adjacent said predetermined portion of said path.

2. The combination of claim 1, wherein said follower includes a lever which is pivotable with reference to said holder about a predetermined axis, said lever having a first arm including said first portion and a second arm including said second portion.

3. The combination of claim 1, further comprising means for connecting said signal generating means to said brush holder.

4. The combination of claim 1, wherein said follower includes a main portion including said first portion and means for securing said second portion to said main portion.

5. The combination of claim 1, wherein said follower includes a one-piece lever having first and second arms respectively including said first and second portions.

6. The combination of claim 1, wherein said holder includes a section which is located in the path of movement of said first portion and arrests said first portion in response to additional wear upon said brush beyond said predetermined amount of wear, said second portion cooperating with said signal generating means to effect the generation of said signal during the interval which elapses while the brush undergoes said additional wear.

7. The combination of claim 6 wherein said brush holder includes a substantially tubular socket for said brush and said socket includes said section.

8. The combination of claim 1, wherein said portion of said path forms part of a circle.

* * * * *